3,032,396
PREPARATION OF HYDROCYANIC ACID
Douglas J. Kennedy, Shawinigan, Quebec, Canada, assignor to Shawinigan Chemicals Limited, Montreal, Quebec, Canada, a corporation of the Dominion of Canada
No Drawing. Filed July 18, 1960, Ser. No. 43,280
1 Claim. (Cl. 23—151)

This invention relates to the preparation of hydrocyanic acid from ammonia in a fluidized bed furnace apparatus heated by the passage of electricity through the fluidized bed.

It is known to produce hydrocyanic acid by passing a mixture of ammonia and hydrocarbon gases as the fluidizing gas through a fluidized bed of conductive carbon particles which are heated to the appropriate reaction temperature by passing electricity through the bed. It has been found, however, that when using stoichiometric proportions of ammonia and hydrocarbon gas feeds, the resistance of the bed decreases with the passage of time. This decrease in resistance cannot be corrected by the simple expedient of decreasing the amount of fluidized carbon in the bed and the bed cannot be inspected under operating conditions so that the cause for the decrease remains largely undetermined. Accumulation of soot-like deposits of carbon in the bed, derived probably from the decomposition of the hydrocarbon gas, may to some extent account for the decreased resistance. In any event the resistance eventually becomes so low that the resultant abnormally high currents and low voltages across the bed are beyond the capacity of the associated electrical equipment which is designed for a reasonable range of voltage and current.

Difficulties caused by the deposition of carbon arise in many processes and the usual solution is to organize the process on a two-cycle basis, a "make" cycle and a "regenerate" cycle. In the second or "regenerate" cycle all reaction is stopped and the carbon is removed by burning with air or oxygen.

It has been found that in this process it is possible to remove the accumulating carbon and restore the decreased electrical resistance without the use of a burning cycle. It is sufficient sharply to reduce the ratio of hydrocarbon gas to ammonia for a period of operation, but the desired effect is obtained more quickly and preferably by cutting off the hydrocarbon entirely for a shorter period. When sufficient carbon has been removed and the resistance restored to a suitable value, the ratio of hydrocarbon to ammonia is restored to its normal operating value. The invention thus consists, in a process for preparing hydrocyanic acid which comprises maintaining a bed of electrically conductive carbon particles in a fluidized state by passing upwardly through the said bed a stream of ingoing gas consisting of a mixture of ammonia and hydrocarbon gas, passing an electric current through the said fluidized bed with sufficient power to maintain the bed at an elevated temperature sufficient to maintain reaction to form hydrocyanic acid and recovering hydrocyanic acid from the outgoing gas coming off the fluidized bed, of the improvement which comprises maintaining the resistance of the bed within a satisfactory range by decreasing, at periodic intervals and for a short period of the time, the ratio of carbon in the hydrocarbon gas to ammonia, and then restoring the said ratio to the value prevailing in the immediately preceding interval.

Operating at ratios of carbon in the hydrocarbon gas to ammonia as low as 0.6:1 instead of at the stoichiometric ratio of 1.0:1 delays the onset of reduced resistance of the bed but does not obviate it. The reduced ratio to be effective in the correction of abnormal resistance of the bed within a reasonable time must be at least as low as 0.4:1.

In the following examples the volumetric flow rates quoted are cubic feet per hour of gas at 32° F. and one atmosphere pressure. The examples illustrate the invention in the preparation of hydrocyanic acid from ammonia and propane.

*Example 1*

The furnace in which this example was conducted consisted of a refractory-lined steel cylinder, the diameter inside the refractory being 21 inches. Gas was fed into the furnace through three symmetrically arranged diffuser tubes, with closed ends and gas inlet holes in their circumference, which were inserted through the bottom insulation. Three symmetrically arranged graphite rods penetrated the bottom of the furnace into the bed and were electrically connected to act as the bottom electrode. Three graphite electrodes, also electrically connected together, passed into the upper part of the furnace through heat-shielded electrical insulation, and penetrated into the bed through the top. The charge consisted of fluid petroleum coke made by the fluid petroleum coking process in the Montreal refinery of Canadian Petrofina Limited, and had particles larger than 10 mesh and smaller than 48 mesh (U.S. standard sieves) screened out and discarded. The furnace was operated at 2600° F. with the feed gas consisting of 740 cu. ft. per hour of ammonia and 230 cu. ft. per hour of commercial propane. After the starting period the furnace operated at 160 volts and 110 amperes (calculated resistance 0.1455 ohm) which gradually changed to 75 volts and 1550 amperes (calculated resistance 0.0484 ohm) after about 21 hours. As this current was near the limit of the capacity of the electrical equipment, the propane feed was then cut off, leaving the ammonia feed unchanged. The electrical values of the furnace changed gradually and at the end of an hour were 125 volts and 1250 amperes (calculated resistance 0.100 ohm) which was satisfactory for normal operation. The propane feed was thereupon restored to its value preceding the shut-off period. The voltage drop across the furnace continued to rise during the next two and one-half hours, and again achieved a value of 160 volts, and during this period the current slowly fell to 1100 amperes. These satisfactory operating conditions continued for nearly 48 hours, after which the resistance again was dropping. Most significant however, was the fact that during the period of interruption of propane flow, the production of hydrocyanic acid in the furnace did not stop, but continued at a rate somewhat greater than half the normal rate, the carbon for the reaction during the interruption apparently coming from the bed and probably from the soot-like deposits of carbon formed during the preceding operation.

*Example 2*

This example reports observations made several months later in the furnace of Example 1 with minor modifications. After a certain extended period of operation with the feed gas consisting of ammonia and commercial propane, the electrical values of the furnace were 100 volts and 1900 amperes (calculated resistance 0.053 ohm). The ammonia feed was maintained at 1200 cu. ft. per hour for 50 minutes with no propane feed and the electrical readings reached the satisfactory values of 175 volts and 1600 amperes (calculated resistance 0.1094 ohms), whereupon the ammonia feed was reduced to 800 cu. ft. per hour and the propane feed was resumed at 260 cu. ft. per hour. During the period of feed of ammonia alone, hydrocyanic acid was produced at a significant rate but less than the rate of production with both ammonia and propane being fed to the furnace.

It has been observed that, after extended periods of operation at the preferred proportions of carbon in the hydrocarbon gas to amonia within the range 1.0:1 to 0.93:1, a relatively long period of operation at low or even zero ratio is required to re-establish appropriate values of bed resistance. It is preferred to operate in cycles of 24 hours and in each cycle to reduce the ratio of carbon in the hydrocarbon gas to ammonia to zero (i.e., to feed no hydrocarbon gas whatever) for a short period ranging from 15 to 60 minutes. The 24 hour cycle of time is chosen so that the resistance of the furnace is maintained within suitable values.

It has been indicated in the examples that during the periods of feed of ammonia only to the reactor, formation of hydrocyanic acid continued, although at a lower rtae than when both ammonia and propane were being fed to the reactor. The rate of formation of hydrocyanic acid, at equal rates of feed of ammonia, is directly proportional to the yield of hydrocyanic acid calculated on the ammonia feed. Normal operation of the process with hydrocyanic acid being formed from ammonia and propane gives hydrocyanic acid yields of at least 80 to 85% based on the ammonia feed. During the periods of feed of ammonia only to a reactor, yields of hydrocyanic acid of 60%, based on the ammonia feed, have been obtained during periods of an hour of such operation. This corresponds to about 70 to 75% of normal operation yield, and is remarkably high in comparison to conventional "regenerate" cycle periods in which zero yield of product is obtained.

What is claimed is:

In a process for preparing hydrocyanic acid which comprises maintaining a bed of electrically conductive carbon particles in a fluidized state by passing upwardly through the said bed a stream of ingoing gas consisting of a mixture of amonia and hydrocarbon gas, passing an electric current through the said fluidized bed with sufficient power to maintain the bed at an elevated temperature sufficient to maintain reaction to form hydrocyanic acid and recovering hydrocyanic acid from the outgoing gas coming off the fluidized bed, the improvement which comprises maintaining the resistance of the bed within a satisfactory range by decreasing, at periodic intervals of twenty-one to forty-eight hours and for a short period of the time within the range fifteen to sixty minutes, the ratio of carbon in the hydrocarbon gas to ammonia from its original value within the range 1.0:1 to 0.6:1 to a decreased value within the range 0.4:1 and zero, and then restoring the said ratio to the value prevailing in the immediately preceding interval.

References Cited in the file of this patent

UNITED STATES PATENTS

| | | |
|---|---|---|
| 1,584,137 | Poindexter | May 11, 1926 |
| 2,958,584 | Johnson et al. | Nov. 1, 1960 |